(12) United States Patent
Sakamoto

(10) Patent No.: US 9,489,585 B2
(45) Date of Patent: Nov. 8, 2016

(54) LANE MARK RECOGNITION DEVICE

(71) Applicant: HONDA MOTOR CO., LTD., Minato-Ku, Tokyo (JP)

(72) Inventor: Yosuke Sakamoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/659,818

(22) Filed: Mar. 17, 2015

(65) Prior Publication Data

US 2015/0294164 A1 Oct. 15, 2015

(30) Foreign Application Priority Data

Apr. 14, 2014 (JP) ................................. 2014-083219

(51) Int. Cl.
*G06K 9/00* (2006.01)
(52) U.S. Cl.
CPC ................................ *G06K 9/00798* (2013.01)
(58) Field of Classification Search
CPC ............. G06K 9/4652; G06K 9/6205; G06K 9/4609; G06T 2207/30256; G06T 7/408; G06T 2207/20061; G06T 7/0042; G06T 7/0085; G06T 2207/10024; G06T 2207/30204; G06T 2207/20148
See application file for complete search history.

(56) References Cited

U.S. PATENT DOCUMENTS

| 2009/0167864 A1* | 7/2009 | Unoura | G06K 9/00798 348/148 |
| 2009/0268026 A1* | 10/2009 | Mori | G06K 9/00798 348/148 |
| 2012/0194677 A1* | 8/2012 | Suzuki | G06K 9/00798 348/148 |

FOREIGN PATENT DOCUMENTS

| JP | 2003-187227 A | | 7/2003 | |
| JP | 2005-157731 | * | 6/2005 | ............ B06R 21/00 |
| JP | 3854143 B2 | | 12/2006 | |

\* cited by examiner

*Primary Examiner* — Amara Abdi
(74) *Attorney, Agent, or Firm* — Carrier Blackman & Associates, P.C.; William D. Blackman; Joseph P. Carrier

(57) ABSTRACT

An edge image generating unit 12 generates an edge image 22, into which edge points whose variation in luminance relative to a surrounding portion is equal to or more than a predetermined value have been extracted, from an image 21 captured by a camera 2. A candidate image portion extracting unit 13 extracts a candidate image portion, which is a candidate for an image portion of a dashed-line lane mark, from the edge image 22. A dashed-line lane mark recognizing unit 14 recognizes the dashed-line lane mark based on a plurality of candidate image portions each of whose length in the corresponding real space is within a predetermined range and which are continuous in a given direction among the candidate image portions.

10 Claims, 7 Drawing Sheets

LANE MARK RECOGNITION DEVICE

CROSS-REFERENCE TO RELATED APPLICATION

Priority is claimed under 35 U.S.C. 119 on Japanese Patent Application No. 2014-083219, filed on Apr. 14, 2014, the contents of which are incorporated herein by reference.

BACKGROUND OF THE INVENTION

1. Field of the Invention

The present invention relates to a lane mark recognition device which recognizes a lane mark provided on a road based on an image captured by a camera mounted in a vehicle.

2. Description of the Related Art

Conventionally, there has been known a lane mark recognition device which recognizes a lane mark such as a white line for dividing a traveling lane provided on a road from an image of the road ahead of a vehicle captured by a camera mounted in the vehicle.

In the conventional lane mark recognition device, there were cases where the recognition accuracy of a lane mark has been decreased by an influence of noise in the image captured by the camera.

The present invention has been provided in view of the above background. Therefore, an object of the present invention is to provide a lane mark recognition device which provides an enhanced recognition accuracy of a lane mark.

SUMMARY OF THE INVENTION

The present invention relates to a lane mark recognition device, which recognizes a lane mark provided on a road based on an image of the surroundings of a vehicle captured by a camera mounted in the vehicle, and a vehicle and a lane mark recognition method therefor.

A lane mark recognition device of the present invention includes: an edge image generating unit which generates an edge image, into which edge points whose variation in luminance relative to a surrounding portion is equal to or more than a predetermined value have been extracted, from the image captured by the camera; a candidate image portion extracting unit which extracts a candidate image portion, which is a candidate for an image portion of a dashed-line lane mark, from the edge image; and a dashed-line lane mark recognizing unit which recognizes the dashed-line lane mark based on a plurality of candidate image portions each of whose length in a corresponding real space is within a predetermined range and which are continuous in a given direction among the candidate image portions.

According to the lane mark recognition device of the present invention, the dashed-line lane mark recognizing unit recognizes a dashed-line lane mark based on a plurality of candidate image portions each of whose length in the corresponding real space is within a predetermined range and which are continuous in a given direction. This enables the dashed-line lane mark to be recognized accurately by excluding the candidate image portions unlikely to be image portions of the dashed-line lane mark since the length in the corresponding real space of each of the candidate image portions is out of the predetermined range or since the candidate image portions are not continuous in the given direction.

Moreover, the predetermined range is set based on a specified length for the dashed-line lane mark.

According to this configuration, the predetermined range is set based on the length of the dashed-line lane mark defined by a traffic law or the like, thereby enabling an increase in the accuracy of recognizing image portions of the dashed-line lane mark.

Furthermore, the predetermined range is set based on the length in the corresponding real space of the candidate image portion which has already been recognized to be an image portion of the dashed-line lane mark by the dashed-line lane mark recognizing unit.

According to this configuration, the predetermined range is able to be set according to the actual length of the dashed-line lane mark.

Furthermore, the dashed-line lane mark recognizing unit determines the continuity in the given direction with the candidate image portion whose position in the corresponding real space is nearest to the vehicle among the candidate image portions as a starting point.

According to this configuration, the starting point is set to the candidate image portion expected to be recognized with high accuracy since the candidate image portion is nearest to the vehicle, thereby enabling the continuity in the given direction to be easily determined.

Moreover, the dashed-line lane mark recognizing unit re-determines the continuity in the given direction with the image portions shorter than the predetermined range as the candidate image portions in a case where a direction of a virtual line connecting the candidate image portions continuous in the given direction is inappropriate as a traveling direction of the vehicle.

According to this configuration, in the case where the appropriate image portions of the dashed-line lane mark cannot be extracted from the candidate image portions whose length in the corresponding real space is within the predetermined range, the extraction condition is relaxed, thereby enabling the extraction of the image portions of the dashed-line lane mark which have been shortened due to fading or the like.

Moreover, the candidate image portion extracting unit excludes image portions having a size equal to or less than a predetermined size and extracts the candidate image portions from the edge image.

According to this configuration, the image portions, which are smaller in size and supposed to be other than image portions of the dashed-line lane mark, are excluded, thereby reducing the amount of computation required for extracting the candidate image portions and enabling an increase in the recognition speed of the dashed-line lane mark.

Furthermore, the dashed-line lane mark recognizing unit sets the given direction based on the traveling direction of the vehicle in the case where the dashed-line lane mark is formed by raised markers.

This configuration enables an increase in the recognition accuracy of raised markers (Botts Dots, etc.) susceptible to noise due to their short length.

Moreover, the edge image generating unit generates the edge image at each predetermined control cycle from the image of the surroundings of the vehicle captured by the camera at each predetermined control cycle and the dashed-line lane mark recognizing unit sets the moving direction of the candidate image portions supposed to be the image portions of the same lane mark between the continuous time-series edge images generated by the edge image generating unit as the given direction.

According to this configuration, the accuracy of determining the continuity of the image portions of the dashed-line lane mark is able to be increased by estimating the direction of the dashed-line lane mark from the time-series images.

Moreover, the lane mark recognition device further includes: a continuous-line lane mark recognizing unit which recognizes a continuous-line lane mark from the image captured by the camera; and a lane recognizing unit which recognizes a lane by using only a recognition result of the continuous-line lane mark in a case where the continuous-line lane mark recognizing unit recognizes one of right and left lane marks of the lane as a continuous-line lane mark and the dashed-line lane mark recognizing unit recognizes the other of the right and left lane marks of the lane as a dashed-line lane mark and where a recognition reliability of the dashed-line lane mark is a predetermined level or lower.

According to this configuration, the recognition result of the continuous-line lane mark, which is supposed to be easily recognized and to be recognized with high accuracy, is preferentially used in the case where the lane is demarcated by a dashed-line lane mark and a continuous-line lane mark, thereby enabling an increase in the recognition accuracy of the lane.

Furthermore, the lane mark recognition device further includes: a continuous-line lane mark recognizing unit which recognizes a continuous-line lane mark from the image captured by the camera; and a steering control unit which performs steering control of the vehicle so that the vehicle travels within a lane demarcated by lane marks recognized by the dashed-line lane mark recognizing unit or the continuous-line lane mark recognizing unit and performs the steering control by setting an allowable distance between the vehicle and the dashed-line lane mark in the case where the lane is recognized to be demarcated by the dashed-line lane mark to be smaller than an allowable distance between the vehicle and the continuous-line lane mark in the case where the lane is recognized to be demarcated by the continuous-line lane mark.

According to this configuration, an allowable distance between the vehicle and the dashed-line lane mark which allows a lane change is set to be smaller than an allowable distance between the vehicle and the continuous-line lane mark which often prohibits a lane change, thereby enabling restraint of steering assist excessive for the driver of the vehicle.

A vehicle of the includes: a camera which captures an image of surroundings; an edge image generating unit which generates an edge image, into which edge points whose variation in luminance relative to a surrounding portion is equal to or more than a predetermined value have been extracted, from the image captured by the camera; a candidate image portion extracting unit which extracts a candidate image portion, which is a candidate for an image portion of a dashed-line lane mark, from the edge image; and a dashed-line lane mark recognizing unit which recognizes a dashed-line lane mark based on a plurality of candidate image portions each of whose length in a corresponding real space is within a predetermined range and which are continuous in a given direction among the candidate image portions.

According to the vehicle of the present invention, the dashed-line lane mark recognizing unit recognizes a dashed-line lane mark based on a plurality of candidate image portions each of whose length in the corresponding real space is within a predetermined range and which are continuous in a given direction. This enables the dashed-line lane mark to be recognized accurately by excluding the candidate image portions unlikely to be image portions of the dashed-line lane mark since the length in the corresponding real space of each of the candidate image portions is out of the predetermined range or since the candidate image portions are not continuous in the given direction.

A lane mark recognition method of the present invention recognizes a lane mark provided on a road based on an image of surroundings of a vehicle captured by a camera mounted in the vehicle, the method including: an edge image generating step of generating an edge image, into which edge points whose variation in luminance relative to a surrounding portion is equal to or more than a predetermined value have been extracted, from the image captured by the camera; a candidate image portion extracting step of extracting a candidate image portion, which is a candidate for an image portion of a dashed-line lane mark, from the edge image; and a dashed-line lane mark recognizing step of recognizing the dashed-line lane mark based on a plurality of candidate image portions each of whose length in a corresponding real space is within a predetermined range and which are continuous in a given direction among the candidate image portions.

According to the lane mark recognition method of the present invention, a dashed-line lane mark is recognized based on a plurality of candidate image portions each of whose length in the corresponding real space is within a predetermined range and which are continuous in a given direction in the dashed-line lane mark recognizing step. This enables the dashed-line lane mark to be recognized accurately by excluding the candidate image portions unlikely to be image portions of the dashed-line lane mark since the length in the corresponding real space of each of the candidate image portions is out of the predetermined range or since the candidate image portions are not continuous in the given direction.

DESCRIPTION OF THE PREFERRED EMBODIMENTS

An embodiment of a lane mark recognition device according to the present invention will be described with reference to FIGS. 1 to 7.

Figure 1:
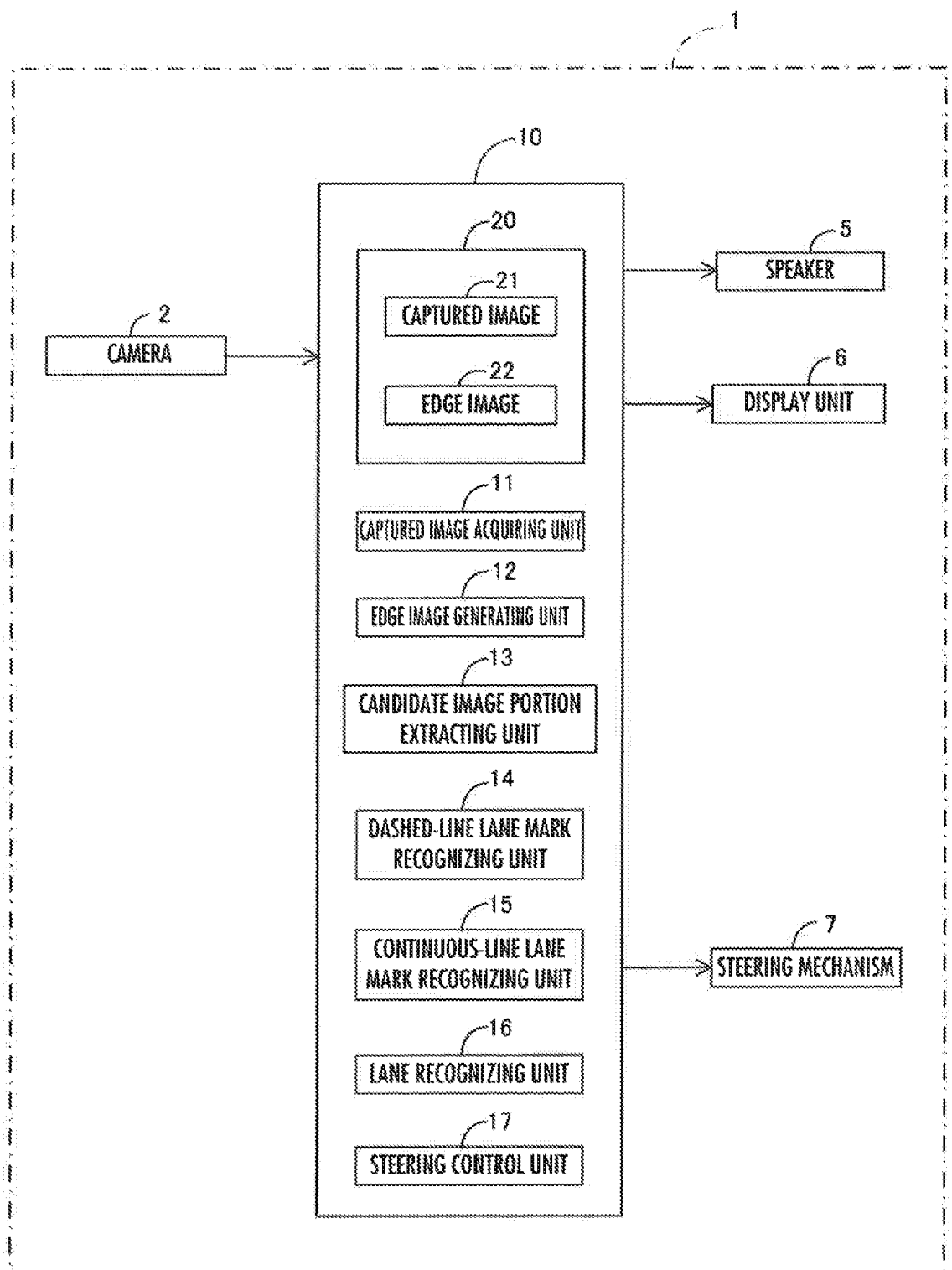
FIG. 1 is a block diagram illustrating a lane mark recognition device.

Referring to FIG. 1, a lane mark recognition device 10 is mounted in a vehicle 1 (corresponding to a vehicle of the present invention) provided with a camera 2 (color camera), a speaker 5, a display unit 6, and a steering mechanism 7.

The lane mark recognition device 10 is an electronic unit including a CPU, a memory, various interface circuits and the like, which are not illustrated, and executes programs for lane mark recognition and steering control retained in the memory by using the CPU to function as a captured image acquiring unit 11, an edge image generating unit 12, a candidate image portion extracting unit 13, a dashed-line lane mark recognizing unit 14, a continuous-line lane mark recognizing unit 15, a lane recognizing unit 16, and a steering control unit 17. Moreover, the lane mark recognition device 10 performs a lane mark recognition method of the present invention.

Figure 2:
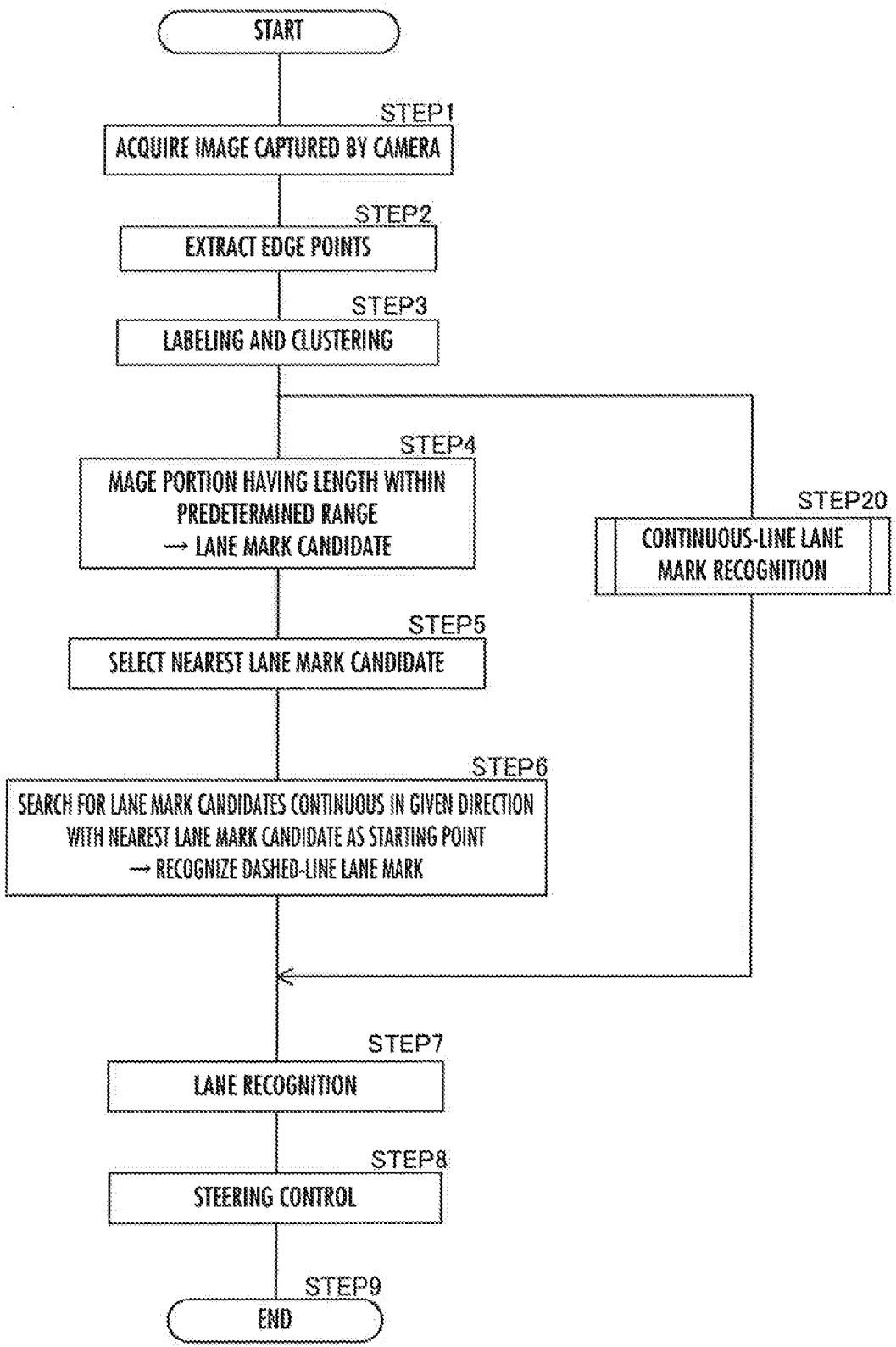
FIG. 2 is a flowchart of lane mark recognition processing.

With reference to the flowchart illustrated in FIG. 2, the following describes processing of recognizing a lane mark provided on a road by the lane mark recognition device 10. The lane mark recognition device 10 recognizes a lane mark (a continuous-line lane mark and a dashed-line lane mark) on the road on which the vehicle 1 is traveling by performing processing of the flowchart illustrated in FIG. 2 at each predetermined control cycle.

STEP 1 in FIG. 2 is a process performed by the captured image acquiring unit 11. The captured image acquiring unit 11 inputs a video signal of a view ahead of the vehicle 1 (corresponding to the surroundings of a vehicle of the present invention) output from the camera 2 to acquire a color captured image 21 having the R, G and B values as data of pixels from the color components (the R, G, and B values) of the video signal. Then the data of the captured image 21 is retained in an image memory 20.

The subsequent STEP 2 is a process performed by the edge image generating unit 12. The process step performed by the edge image generating unit 12 corresponds to an edge image generating step in the lane mark recognition method of the present invention.

The edge image generating unit 12 performs a process of transforming the color components of the captured image 21 to the luminance to generate a grayscale image (a multivalued image). Then, the edge image generating unit 12 extracts edge points (pixels [an image portion] whose luminance difference [variation in luminance] from the pixels of the surroundings is a predetermined value or more) from the grayscale image to generate an edge image 22 (see FIG. 1).

In the case where the camera 2 is a monochromatic camera, a grayscale captured image is acquired from the luminance of each pixel and therefore it is unnecessary to perform the foregoing process of generating the grayscale image from the color captured image.

Figure 3A:
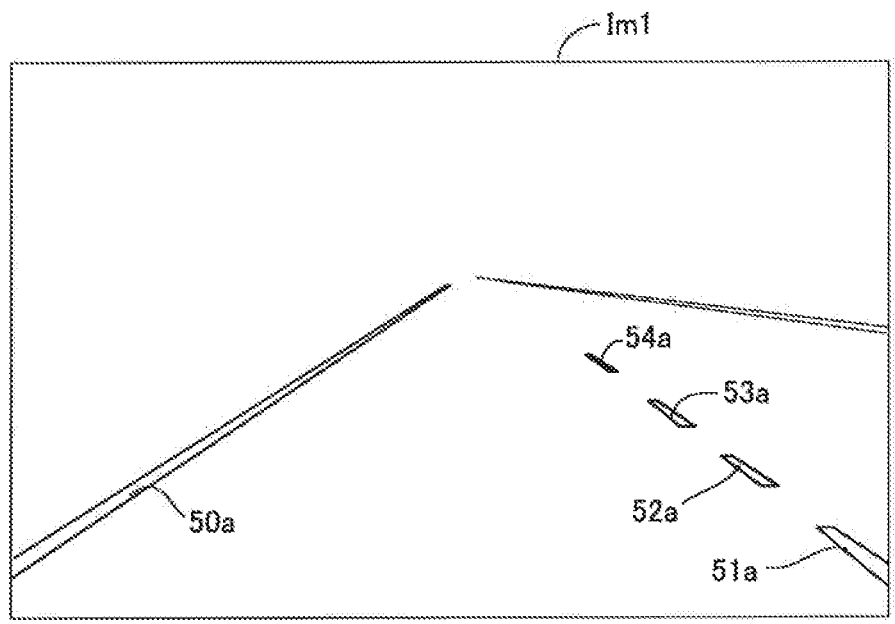
FIG. 3A is an explanatory diagram illustrating a captured image and FIG. 3B is an explanatory diagram illustrating an edge image.

In this regard, reference character Im1 illustrated in FIG. 3A indicates an example of a grayscale image generated from the captured image 21, including the image portions of a continuous-line lane mark 50*a* and a dashed-line lane mark 51*a* to 54*a* which demarcate the lane on which the vehicle 1 (self-vehicle) is traveling.

Figure 3B:
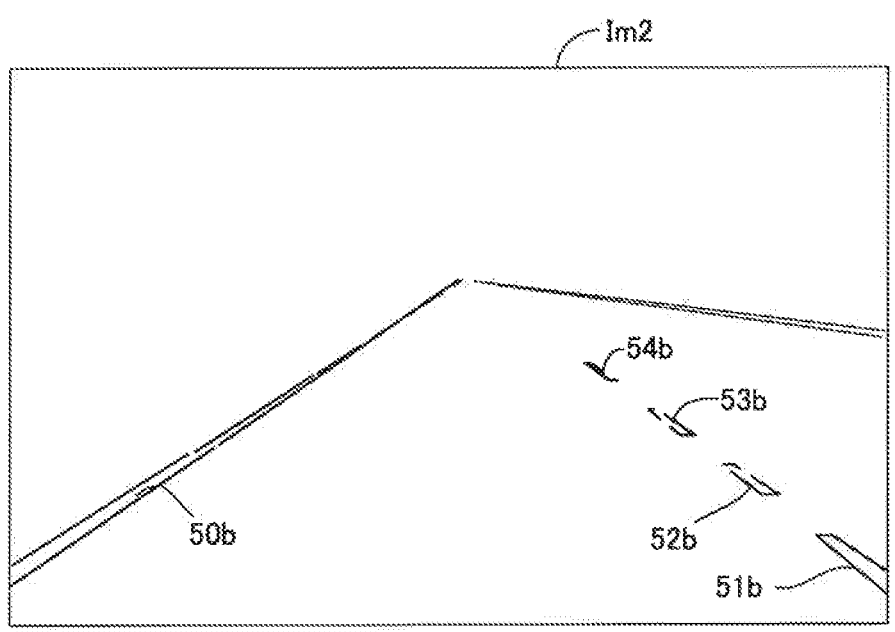

Reference character Im2 illustrated in FIG. 3B indicates an edge image generated by performing edge extraction processing on the grayscale image Im1. In the edge image Im2, the image portion 50*b* of the continuous-line lane mark and the image portions 51*b* to 54*b* of the dashed-line lane mark are image portions including plenty of linearly-continuous edge points.

The subsequent STEP 3 is a process performed by the candidate image portion extracting unit 13. The candidate image portion extracting unit 13 performs labeling for labeling an area of gathering edge points (hereinafter, referred to as "edge portion") and clustering for association of adjacent edge portions as image portions of the same object for the edge image Im2.

The process step performed by the candidate image portion extracting unit 13 corresponds to a candidate image portion extracting step in the lane mark recognition method of the present invention.

The subsequent STEPS 4 to 6 are processes performed by the dashed-line lane mark recognizing unit 14. Moreover, the recognition processing of the continuous-line lane mark of STEP 20 is performed by the continuous-line lane mark recognizing unit 15 in parallel with the processes of STEPS 4 to 6.

The process step performed by the dashed-line lane mark recognizing unit 14 corresponds to a dashed-line lane mark recognizing step in the lane mark recognition method of the present invention.

In STEP 4, the dashed-line lane mark recognizing unit 14 performs inverse projection transformation from the camera coordinates to the real space coordinates for each of the image portions clustered in the edge image 22 to calculate the position of an object in the real space corresponding to each image portion. Incidentally, an image portion having a size equal to or less than a predetermined size (a size from which the image portion is supposed to be other than the image portion of a dashed-line lane mark) may be excluded.

Then, the dashed-line lane mark recognizing unit 14 extracts image portions each of whose length in the corresponding real space is within a predetermined range (set with reference to the length [specified length] of a dashed-line lane mark defined by a law) as candidate image portions which are candidates for image portions of the dashed-line lane mark. Hereinafter, an object in the real space corresponding to the candidate image portion is referred to as a dashed-line lane mark candidate.

Figure 4:
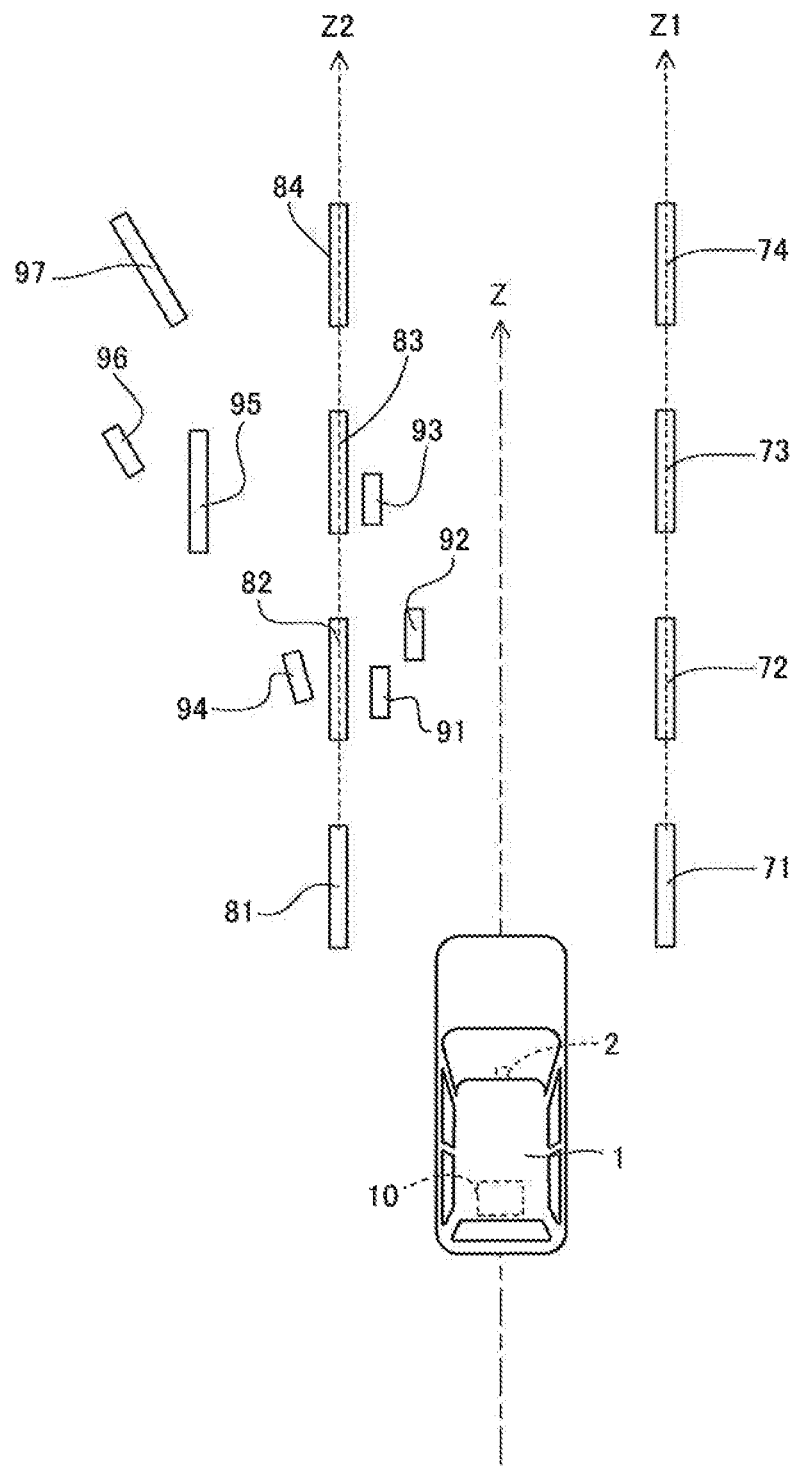
FIG. 4 is an explanatory diagram illustrating recognition processing of a dashed-line lane mark.

Referring to FIG. 4, the following describes a process of extracting candidate image portions in STEP 4. FIG. 4 illustrates the clustered image portions transformed to those in the real space by the inverse projection transformation, where objects 71 to 74, 81 to 84, and 91 to 97 ahead of the vehicle 1 (self-vehicle) are illustrated.

Among the objects 71 to 74, 81 to 84, and 91 to 97, objects 91 to 94 and 96 each of whose length (length in the traveling direction Z of the vehicle 1) is less than the predetermined range are excluded, while objects 71 to 74, 81 to 84, 95, and 97 each of whose length is within the predetermined range are extracted as dashed-line lane mark candidates.

In the next STEP 5, the dashed-line lane mark recognizing unit 14 detects a dashed-line lane mark candidate nearest to the vehicle 1 (the nearest lane mark candidate). In the example of FIG. 4, the dashed-line lane mark recognizing unit 14 detects 71 as the right-side nearest dashed-line lane mark candidate and detects 81 as the left-side nearest dashed-line lane mark candidate.

In the next STEP 6, the dashed-line lane mark recognizing unit 14 searches for dashed-line lane mark candidates continuous in a given direction with the right-side nearest lane mark candidate 71 as the starting point and recognizes a plurality of dashed-line lane mark candidates 72, 73, and 74 continuous in the Z1 direction as a dashed-line lane mark.

Similarly, the dashed-line lane mark recognizing unit 14 searches for dashed-line lane mark candidates continuous in a given direction with the left-side nearest lane mark candidate 81 as the starting point and recognizes a plurality of dashed-line lane mark candidates 82, 83, and 84 continuous in the Z2 direction as a dashed-line lane mark. In this case, dashed-line lane mark candidates 95 and 97 not continuous in the Z2 direction are determined to be not a dashed-line lane mark.

The continuity either may be determined after the transformation to the real space coordinates as illustrated in FIG. 4 or may be determined with respect to the candidate image portions in the edge image 22. Alternatively, the continuity in the given direction may be determined with a lane mark candidate located in the intermediate position (a lane mark candidate between the lane mark candidate nearest the vehicle 1 and the lane mark candidate farthest from the vehicle 1), instead of the nearest lane mark candidate, as the starting point.

Figure 5:
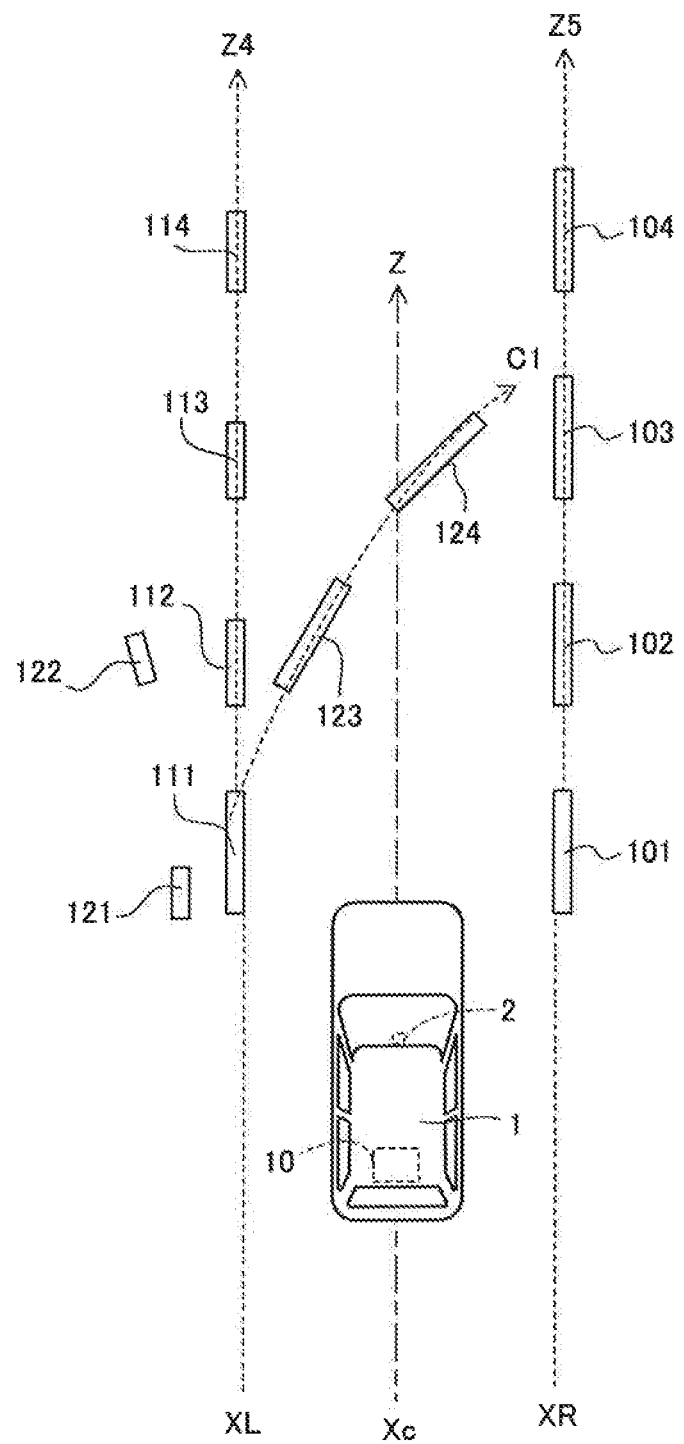
FIG. 5 is an explanatory diagram illustrating the determination of continuity in a given direction of a dashed line.

Moreover, as illustrated in FIG. 5, in the case where a direction C1 (corresponding to the direction of a virtual line connecting the candidate image portions continuous in the given direction of the present invention) in which left-side dashed-line lane mark candidates 111, 123, and 124 each of whose length is within the predetermined range are continuous, is directed to the right-side dashed-line lane mark 101 to 104, and is inappropriate as a lane mark laying mode, the dashed-line lane mark recognizing unit 14 relaxes the extraction condition of the dashed-line lane mark and searches for other dashed-line lane mark candidates.

More specifically, the dashed-line lane mark recognizing unit 14 re-determines the continuity in the given direction also with respect to dashed-line lane mark candidates each of whose length is shorter than the predetermined range. In the example of FIG. 5, the dashed-line lane mark recognizing unit 14 recognizes dashed-line lane mark candidates 111, 112, 113, and 114 continuous in the Z4 direction as a dashed-line lane mark.

Moreover, in the case where the lane is demarcated by a continuous-line lane mark (a white line, a yellow line, etc.), the continuous-line lane mark is recognized by the process of STEP 20. The recognition processing of the continuous-line lane mark is performed by using a known technique described in, for example, Japanese Patent Application Laid-Open No. H 11-219435.

STEP 7 is a process performed by the lane recognizing unit 16. The lane recognizing unit 16 recognizes a lane on which the vehicle 1 is traveling based on a dashed-line lane mark recognized by the dashed-line lane mark recognizing unit 14 or a continuous-line lane mark recognized by the continuous-line lane mark recognizing unit 15.

Figure 6:
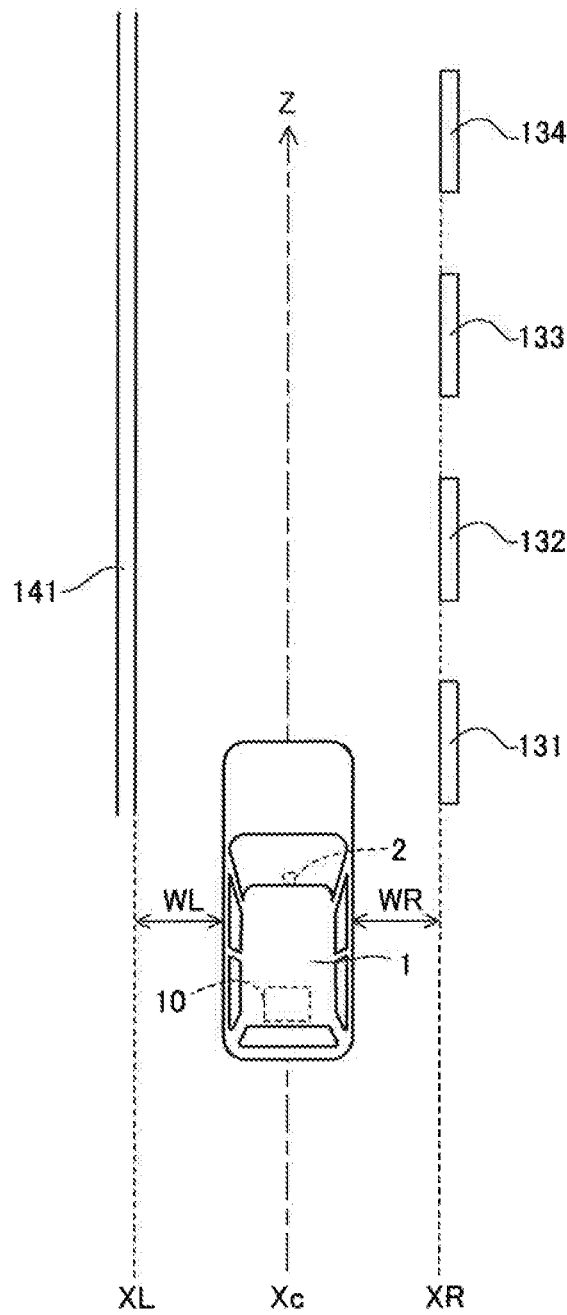
FIG. 6 is an explanatory diagram illustrating steering control in the case where a lane is demarcated by a dashed-line lane mark and a continuous-line lane mark.

In the case where a continuous-line lane mark 141 (left lane mark) and a dashed-line lane mark 131 to 134 (right lane mark) demarcating the lane on which the vehicle 1 is traveling are both recognized accurately as illustrated in FIG. 6, the lane recognizing unit 16 calculates the middle position Xc between the inner position XL of the left lane mark 141 and the inner position XR of the right lane mark 131 to 134, with respect to the right and left direction (the direction orthogonal to the traveling direction of the vehicle 1) of the vehicle 1.

The next STEP 8 is a process performed by the steering control unit 17. The steering control unit 17 activates the steering mechanism 7 to assist a driver in driving operation of the vehicle 1 so that the vehicle 1 travels near the middle position Xc within the lane.

In this regard, in the case where a distance WR between the vehicle 1 and the right lane mark 131 to 134 or a distance WL between the vehicle 1 and the left lane mark 141 goes to a value equal to or less than a preset determination value due to an increase in the deviation of the vehicle 1 from the middle position Xc, the steering control unit 17 activates the steering mechanism 7 to control the vehicle 1 to approach the middle position Xc.

In addition, in the case where it is prescribed that a lane change to an adjacent lane is allowed on the dashed-line lane mark side while the lane change is inhibited on the continuous-line lane mark side, the driver does not feel reluctant to approach the dashed-line lane mark side. Therefore, the steering control unit 17 sets an allowable distance on the dashed-line lane mark side (the allowable distance WR on the right side in FIG. 6) to a value smaller than an allowable distance on the continuous-line lane mark side (the allowable distance WL on the left side in FIG. 6).

The setting of the allowable distance between the vehicle 1 and the lane mark in this manner causes an assist with steering control when the driver approaches the dashed-line lane mark without feeling reluctant so much, thereby enabling the suppression of excessive assist, which is troublesome to the driver.

[Modified Embodiment 1]

Figure 7:
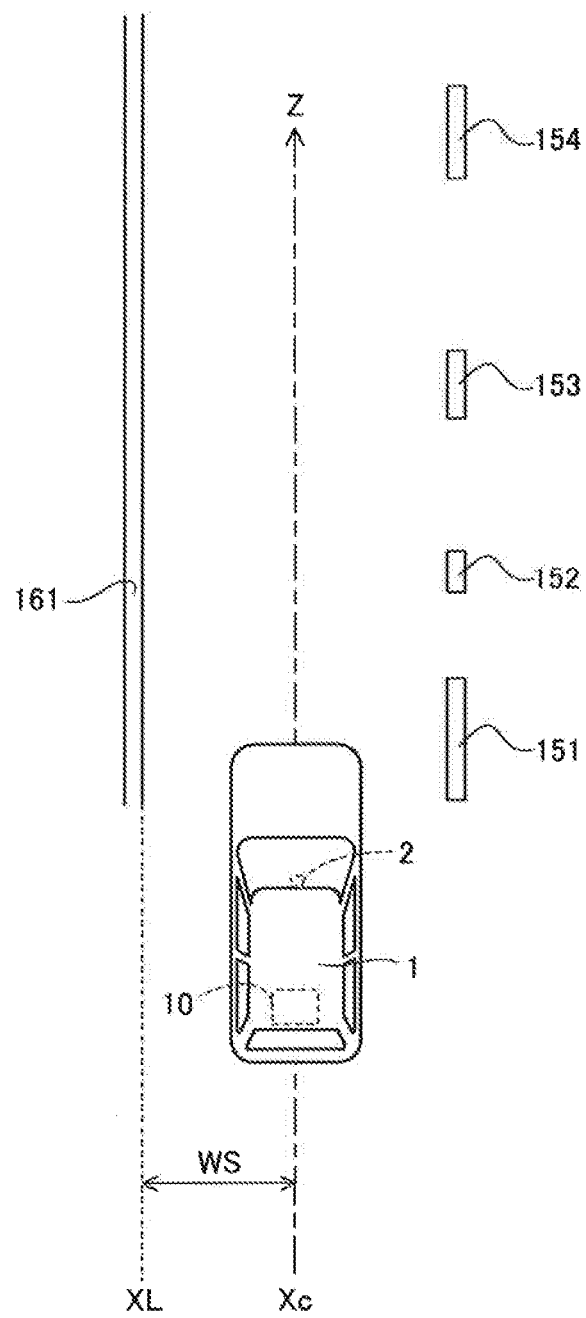
FIG. 7 is an explanatory diagram illustrating processing performed in the case where the recognition accuracy of the dashed-line lane mark is low.

In the case where the lane on which the vehicle 1 is traveling is demarcated by a continuous-line lane mark 161 and a dashed-line lane mark 151 to 154 and the recognition accuracy of the dashed-line lane mark 151 to 154 is a predetermined level or lower since the length of each image portion of the dashed-line lane mark 152 and 153 is shorter than the predetermined range as illustrated in FIG. 7, the lane recognizing unit 16 may recognize the lane only by using the continuous-line lane mark 161.

In this case, the lane recognizing unit 16 sets a position Xc a distance WS away from the inner position XL of the continuous-line lane mark 161 to the center of the lane. The distance WS is set based on lane width data and the lane width data either may be acquired from map data of a navigation device (not illustrated) provided in the vehicle 1 or may be previously retained in the memory as general road width data.

[Modified Embodiment 2]

In the case where the dashed-line lane mark is supposed to be formed by raised markers such as Botts Dots or the like, the given direction in determining the continuity of the dashed-line lane mark in STEP 6 of FIG. 2 may be the traveling direction of the vehicle 1.

[Modified Embodiment 3]

An image portion supposed to be an image portion of the same dashed-line lane mark is extracted between time-series images captured by a camera 2 and the moving direction of the image portion between the images may be used as the given direction in determining the continuity of the dashed-line lane mark in STEP 6 of FIG. 2.

[Modified Embodiment 4]

The predetermined range used in STEP 4 of FIG. 2 may be set with reference to the length in the corresponding real space (the actual length of the dashed-line lane mark) of the candidate image nearest the vehicle 1 among the candidate images extracted from the edge image 22. In this case, the predetermined range may be set based on the length in the corresponding real space of the candidate image portion which has been recognized as an image portion of the dashed-line lane mark in the previous control cycle.

What is claimed is:

1. A lane mark recognition device which is configured to recognize a lane mark provided on a road based on an initial image of surroundings of a vehicle captured by a camera mounted in the vehicle, said lane mark recognition device comprising a computer having a program stored in nonvolatile memory and comprising:

an edge image generating unit which is configured to generate an edge image, into which a plurality of edge points, whose variation amount in luminance relative to a surrounding portion is equal to or more than a predetermined value, are extracted from the initial image captured by the camera;

a candidate image portion extracting unit which is configured to extract a candidate image portion, which is a candidate for an image portion of a dashed-line lane mark, from the edge image; and a dashed-line lane mark recognizing unit which is configured to recognize the dashed-line lane mark based on a plurality of candidate image portions, each of whose length in a corresponding real space is within a predetermined range and which are continuous in a given direction among the candidate image portions; and a steering control unit which is operable to selectively perform steering control of the vehicle so that the vehicle travels within a recognized lane;

wherein the dashed-line lane mark recognizing unit is configured to determine a continuity in the given direction with a selected candidate image portion whose position in the corresponding real space is nearest the vehicle among the candidate image portions as a starting point.

2. The lane mark recognition device according to claim 1, wherein the predetermined range is set based on a specified length for the dashed-line lane mark.

3. The lane mark recognition device according to claim 2, wherein the candidate image portion extracting unit excludes image portions having a size equal to or less than a predetermined size and extracts the candidate image portions from the edge image.

4. The lane mark recognition device according to claim 1, wherein the predetermined range is set based on the length in the corresponding real space of the candidate image portion which has already been recognized to be an image portion of the dashed-line lane mark by the dashed-line lane mark recognizing unit.

5. The lane mark recognition device according to claim 4, wherein the dashed-line lane mark recognizing unit is configured to re-determine the continuity in the given direction with the image portions shorter than the predetermined range as the candidate image portions in a case where a direction of a virtual line connecting the candidate image portions continuous in the given direction is inappropriate as a traveling direction of the vehicle.

6. A lane mark recognition device which is configured to recognize a lane mark provided on a road based on an initial image of surroundings of a vehicle captured by a camera mounted in the vehicle, said lane mark recognition device comprising a computer having a program stored in nonvolatile memory and comprising:

an edge image generating unit which is configured to generate an edge image, into which a plurality of edge points, whose variation amount in luminance relative to a surrounding portion is equal to or more than a predetermined value, are extracted from the initial image captured by the camera:

a candidate image portion extracting unit which is configured to extract a candidate image portion, which is a candidate for an image portion of a dashed-line lane mark, from the edge image;

a dashed-line lane mark recognizing unit which is configured to recognize the dashed-line lane mark based on a plurality of candidate image portions, each of whose length in a corresponding real space is within a predetermined range, and which are continuous in a given direction among the candidate image portions; and a steering control unit which is operable to selectively perform steering control of the vehicle so that the vehicle travels within a recognized lane;

wherein the dashed-line lane mark recognizing unit is configured to re-determine a continuity in the given direction with the image portions shorter than the predetermined range as the candidate image portions in a case where a direction of a virtual line connecting the candidate image portions continuous in the given direction is inappropriate as a traveling direction of the vehicle.

7. The lane mark recognition device according to claim 1, wherein the dashed-line lane mark recognizing unit sets the given direction based on a traveling direction of the vehicle in a case where the dashed-line lane mark is formed by raised markers.

8. The lane mark recognition device according to claim 1, wherein:

the edge image generating unit is configured to generate the edge image at each predetermined control cycle from the image of the surroundings of the vehicle captured by the camera at each of the predetermined control cycle; and the dashed-line lane mark recognizing unit sets a moving direction of the candidate image portions supposed to be the image portions of the same lane mark between continuous time-series edge images generated by the edge image generating unit as the given direction.

9. A lane mark recognition device which is configured to recognize a lane mark provided on a road based on an initial image of surroundings of a vehicle captured by a camera mounted in the vehicle, said lane mark recognition device comprising a computer having a program stored in nonvolatile memory and comprising:

an edge image generating unit which is configured to generate an edge image, into which a plurality of edge points, whose variation amount in luminance relative to a surrounding portion is equal to or more than a predetermined value, are extracted from the initial image captured by the camera;

a candidate image portion extracting unit which is configured to extract a candidate image portion, which is a candidate for an image portion of a dashed-line lane mark, from the edge image;

a dashed-line lane mark recognizing unit which is configured to recognize the dashed-line lane mark based on a plurality of candidate image portions, each of whose length in a corresponding real space is within a predetermined range, and which are continuous in a given direction among the candidate image portions;

a continuous-line lane mark recognizing unit which is configured to recognize a continuous-line lane mark from the image captured by the camera;

a lane recognizing unit which is configured to recognize a lane by using only a recognition result of the continuous-line lane mark in a case where the continuous-line lane mark recognizing unit recognizes one of right and left lane marks of the lane as the continuous-line lane mark and the dashed-line lane mark recognizing unit recognizes the other of the right and left lane marks of the lane as the dashed-line lane mark and where a recognition reliability of the dashed-line lane mark is at a predetermined level or lower; and a steering control unit which is is operable to selectively perform steering control of the vehicle so that the vehicle travels within a lane recognized by the lane recognizing unit.

10. The lane mark recognition device according to claim 1, further comprising:
 a continuous-line lane mark recognizing unit which is configured to recognize a continuous-line lane mark from the image captured by the camera; and
 wherein the steering control unit is configured to perform steering control of the vehicle so that the vehicle travels within a lane demarcated by lane marks recognized by the dashed-line lane mark recognizing unit or the continuous-line lane mark recognizing unit, and is configured to perform the steering control by setting an allowable distance between the vehicle and the dashed-line lane mark in a case where the lane is recognized to be demarcated by the dashed-line lane mark to a value smaller than an allowable distance between the vehicle, and the continuous-line lane mark in a case where the lane is recognized to be demarcated by the continuous-line lane mark.

* * * * *